US011976560B2

United States Patent
Gaia et al.

(10) Patent No.: US 11,976,560 B2
(45) Date of Patent: May 7, 2024

(54) TURBOMACHINE PROVIDED WITH FLUID SEALING DEVICE

(71) Applicant: TURBODEN S. p. A., Brescia (IT)

(72) Inventors: Mario Gaia, Brescia (IT); Roberto Bini, Brescia (IT); Andrea Monterisi, Brescia (IT)

(73) Assignee: TURBODEN S.P.A., Brescia (IT)

( * ) Notice: Subject to any disclaimer, the term of this patent is extended or adjusted under 35 U.S.C. 154(b) by 524 days.

(21) Appl. No.: 16/962,147

(22) PCT Filed: Jan. 11, 2019

(86) PCT No.: PCT/IB2019/050226
§ 371 (c)(1),
(2) Date: Jul. 14, 2020

(87) PCT Pub. No.: WO2019/145809
PCT Pub. Date: Aug. 1, 2019

(65) Prior Publication Data
US 2020/0408103 A1    Dec. 31, 2020

(30) Foreign Application Priority Data
Jan. 26, 2018 (IT) .................. 102018000002027

(51) Int. Cl.
*F01D 11/00* (2006.01)
*F16J 15/34* (2006.01)
*F16J 15/36* (2006.01)

(52) U.S. Cl.
CPC .......... *F01D 11/001* (2013.01); *F01D 11/003* (2013.01); *F16J 15/3448* (2013.01); *F16J 15/363* (2013.01); *F05D 2240/55* (2013.01); *F05D 2260/406* (2013.01)

(58) Field of Classification Search
CPC ... F01D 11/001; F01D 11/003; F16J 15/2448; F16J 15/363; F05D 2240/55; F05D 2260/406
USPC ........................................ 415/174.1
See application file for complete search history.

(56) References Cited

U.S. PATENT DOCUMENTS

| | | | |
|---|---|---|---|
| 2013/0136583 A1* | 5/2013 | Colombo | F16J 15/46 277/579 |
| 2017/0097095 A1* | 4/2017 | Iguchi | F16J 15/36 |
| 2018/0209292 A1* | 7/2018 | Hiernaux | F01D 25/18 |
| 2020/0308976 A1* | 10/2020 | Borja | F01D 11/18 |
| 2022/0136399 A1* | 5/2022 | Cavagnaro | F01D 11/005 415/230 |
| 2022/0243819 A1* | 8/2022 | Watanabe | F16J 15/18 |

* cited by examiner

*Primary Examiner* — Kenneth J Hansen
*Assistant Examiner* — Kelsey L Stanek
(74) *Attorney, Agent, or Firm* — R. Ruschena Patent Agent, LLC

(57) ABSTRACT

A rotating turbomachine provided with a fluid sealing device, comprising an extensible/dilatable bellows piston to make a sealing surface abut against a rotor disc, or against the head of the shaft, therefore confining the working fluid in the turbomachine stopped during the respective maintenance operations, is described. A coolant is supplied inside the bellows piston during the normal operations of the machine.

10 Claims, 5 Drawing Sheets

TURBOMACHINE PROVIDED WITH FLUID SEALING DEVICE

BACKGROUND OF THE INVENTION

1. Field of the Invention

The present invention concerns a turbomachine provided with a fluid sealing device, i.e. a sealing device for machines having a rotating part with respect to a stator part in the presence of a working fluid, and particularly concerns a sealing device intended to confine the working fluid in the machine when it is stopped for damages or maintenance.

2. Brief Description of the Prior Art

In the sector of systems for the production of closed cycle power, in particular in the field of Organic Rankine Cycles (ORC), the role of mechanical seals is a critical aspect both in terms of design and of the planning and management of the maintenance operations. Leaks originating from mechanical seals, both those of physiological nature and those related to breakages, have strong impact in these types of systems, more than in others, mainly due to the following factors:

high economic value of the working fluid on which the mechanical seal acts;

possible toxicity or creation of explosive environments in conjunction with leaks/leakages in zones in which it is difficult to limit the presence of operators or the use of equipment compliant with the European ATEX standards, or equivalent.

In the past, rotating sealing devices, studied to allow the effective confinement of the working fluid during the operations of the turbomachine, were suggested. However, especially in the presence of high temperatures, the rotating seals can lose their effectiveness and cause significant working fluid leaks or entry of air and lubricating fluids in the machine, which must be resolved by stopping the machine and replacing the rotating seal. When the rotating seal is damaged and, in particular, during its replacement, it loses its ability to confine the working fluid, therefore the inner environment of the machine comes into communication with the outer environment if no particular precautions are applied.

Some solutions of the known art have made it possible to resolve, at least in part, the leak or contamination problems of the working fluid when the turbomachine is stopped.

For example, a sealing and breaking device applied to a turbomachine is described in GB 964 946. The device is used to prevent the passage of the working fluid when the turbomachine is stopped. In particular, the device comprises a metal bellows that connects a stator part and a piston sliding on a cylindrical portion of the machine. When the turbomachine is stopped, the piston is operated by an auxiliary fluid so that to put the piston into contact with a rotor disc.

A sealing device for a centrifugal pump, which comprises a sleeve that can be translated axially along a shaft of the pump by means of an electromagnet, is described in FR 2563583. The end side of the sleeve has a sealing gasket that abuts against a stator or rotor component.

DE 3440635 describes a structure for sealing the rotor of a hydraulic turbine with respect to the casing, and provides a packing and sealing ring arranged between a rotor part and a stator part of the machine.

EP 2591211 describes a fluid sealing device for rotating machines, in which the rotor part comprises at least one disc borne by a rotating shaft supported by bearings, and provided with at least one sealing system defining a first environment A at a first pressure. The stator part has a wall in front of the disc of the rotor part, so that the rotor part and the stator part delimit, between one another, a second environment B containing a fluid at a second pressure higher or lower than the first pressure in the environment A. The first environment A and the second environment B are separated by the sealing system on the rotating shaft. A movable ring 30, concentric to the rotating shaft, is arranged between the wall of the stator part and the disc of the rotor part and is provided with at least one annular sealing gasket facing a part of the disc of the rotor part. The ring can be moved axially on command, when the machine is stopped and before carrying out the maintenance operations, between a rearward inactive position, in which the sealing gasket is away from the disc of the rotor part, and a forward active position, in which the sealing gasket leans on the disc of the rotor part. In practice, the movable ring is moved to the active position when the rotating machine is stopped, to prevent the passage of fluid from one of the environments A, B to the other environment. The movable ring is housed and guided in an annular recess obtained in the wall of the stator part, in front of the disc of the rotor part. The movement of the movable ring from the rearward inactive position to the forward active position is caused by a pressurized fluid. The movement in the opposite direction, towards the rearward inactive position, is obtained by thrust springs positioned between the movable ring and the countercheck ring constrained to said wall of the stator part.

The solution described in EP 2591211 has proven to effectively confine the working fluid when the turbomachine is stopped, especially in turbines operating in an Organic Rankine Cycle ORC and in Chillers with an organic fluid centrifugal compressor. In general, the solution described in EP 2591211 can be used in turbines operating in ORC cycles and in other cycles.

However, the Applicant has discovered that the gaskets described in EP2591211 (in particular those that allow the ring 30 to move axially by making a seal with respect to the stator part) tend to wear quickly, especially in applications in which the working fluid crossing the turbomachine is heated to significantly higher temperatures (i.e., 350-400° C.) with respect to the typical ones of an Organic Rankine Cycle ORC system (typically under 300° C.). The reason was identified in the fact that the movable ring and gaskets also heat up until reaching high temperatures, near those of the working fluid. In particular, the wearing of the gaskets occurs with the loss of the elastic properties, a fact that compromises the effectiveness of the sealing system.

It should also be noted that the selection of the gaskets, in an ORC cycle, is conditioned not only by the temperatures at hand, but also by the chemical compatibility between the gasket material and the organic fluid.

GB-A-2054067 describes a solution according to the preamble of claim 1.

SUMMARY OF THE INVENTION

Object of the present invention is therefore to provide a turbomachine sealing device with greater performances compared to the known solutions, in terms of the confinement of the working fluid in the stopped turbomachine, but also in circumstances in which the working fluid reaches temperatures above 300° C.

In particular, an object of the present invention is to provide a turbomachine provided with a sealing device characterized by greater reliability (operating life) and effectiveness.

Therefore, the present invention concerns a turbomachine provided with a fluid sealing device according to the claims.

In particular, the rotating machines taken into account have a rotor part rotating with respect to a stator part in the presence of a working fluid.

The rotor part comprises at least one rotor disc borne by a rotating shaft, which is in turn supported by bearings; the shaft is preferably provided with at least one seal, for example mechanical, to isolate the working fluid from the outer environment.

A first environment, or outer environment, comprises any chamber, interstice, space or environment present between the sealing device object of the present invention and the outer environment, from which the working fluid must be isolated. A second environment, or inner environment, is defined as the inner space of the machine where the working fluid is present, at pressure higher or lower than the pressure present in the first environment, depending on the specificities of the cycle designed.

The sealing device, which can be operated when the machine is stopped, comprises:
 an annular element concentric to the rotating shaft, provided with at least one annular sealing surface, and
 a seat of the annular element obtained in the stator part or integrally fastened thereto.

The annular element is a bellows piston extensible or dilatable to move the annular sealing surface from a rearward inactive position, at which the annular sealing surface does not interact with the rotor part of the machine, to a forward active position, at which the annular sealing surface abuts against a rotor part of the machine, for example a rotor disc or the shaft itself, and prevents the passage of the working fluid from the inner environment to the outer environment, or vice-versa the entry of air in the inner environment when the machine is stopped. The bellows piston is retractable to take the annular sealing surface back in the rearward position when the machine is operating, i.e. when the rotor part is rotating.

Advantageously, a coolant is supplied inside the bellows piston during the normal operations of the machine, i.e. when the rotor part rotates with respect to the stator part in response to the action exerted by or on the working fluid. The coolant can be the working fluid of the turbomachine, or a different fluid.

Preferably, the bellows piston comprises at least one coolant supply duct, and at least one respective discharge duct, both configured to achieve the circulation of the coolant in the inner volume of the bellows piston.

The present solution allows to reach, other conditions being equal, a longer useful life of the sealing unit itself, thanks to the lack of the more critical o-rings, and of the mechanical seal of the turbomachine, thanks to the cooling action that will be described here below, with respect to currently available solutions. At the same time, the present solution allows to minimize the duration of the maintenance operations and to simplify these interventions. In fact, the activation of the device does not require the dismantling of machine parts, but simply requires the pressurization of the bellows piston.

In general, with respect to traditional solutions, other conditions being equal, the sealing device according to the present invention allows to minimize the number of machine stops caused by the breakage of the mechanical seals, and allows to intervene more rapidly.

In fact, a great advantage of the present solution is constituted by the possibility, described hereunder, of more effectively cooling the bellows piston, thus increasing the useful life of the mechanical seal.

Preferably, the seat of the bellows piston is an annular seat concentric to the rotating shaft, for example outside of the mechanical seal active on the shaft. The seat extends in the axial direction, i.e. parallel to the rotation axis of the rotating shaft, between the stator part of the machine to a point facing the rotor disc. When operated, the bellows piston slides axially in the seat due to the expansion/dilatation caused by the pressurized fluid with which it is supplied. For this technical characteristic, the Applicant reserves the right to file a divisional Patent Application, aside from the fact that the bellows piston is supplied with a coolant, i.e. independently from the characterizing part of claim 1.

In the preferred embodiment, the bellows piston comprises two cylindrical bellows elements, which have different diameters and are concentrically arranged, joined to a first ring at a first edge and to a second ring at the opposite edge. Preferably, the elements just described are made of metal and joined by welding. An inner pressurizable volume is defined between the two cylindrical bellows elements and the two rings; the activation of the bellows piston is obtained by pressurizing the inner volume, i.e. by supplying this inner volume with a pressurized fluid, for example compressed air or oil. For this purpose, a supply duct of a pressurized fluid extends through the first ring. Also for this technical characteristic, the Applicant reserves the right to file a divisional Patent Application, aside from the fact that the bellows piston is supplied with a coolant.

The first ring is inserted in the seat of the bellows piston and faces the stator part of the machine; the second ring bears the sealing surface and faces a component of the rotor part of the machine, for example a rotor disc or the head of the shaft. When the bellows piston is operated, the interstice initially present between the sealing surface of the bellows piston and the rotor part of the machine is annulled.

The operations of the sealing unit are simple: the bellows piston can be operated by pressurizing the inner volume to a pressure higher than the one present in the second environment and sufficient to cause the elastic deformation in an axial direction of the bellows, and can be deactivated by restoring, in the inner volume, a pressure lower than the minimum one necessary for moving the sealing surface of the bellows into contact with the rotor part.

In an alternative embodiment of the sealing unit, at least one of the two cylindrical bellows elements comprises one or more radial septa dividing the inner volume of the bellows piston in two or more communicating chambers. The communicating chambers are arranged in succession between the first ring and the second ring. The chamber near to the second ring can be supplied with a coolant that reaches the other chambers by overtaking the radial septa, where these are interrupted. The coolant removes heat from the bellows piston, maintaining both the sealing surface of the system object of the present invention and the mechanical seal arranged between the bellows piston and shaft at a controlled temperature.

Preferably, the bellows piston has an inlet for the coolant obtained in the first ring and a cannula extending from the inlet to the chamber near to the second ring, and comprising an outlet for the coolant obtained in the first ring, in a position diametrically opposed with respect to the inlet. This configuration defines a mandatory path for the coolant, preventing it from stagnating and ensuring it reaches all of the inner surfaces of the bellows piston.

A second aspect of the present invention concerns a method of confining a working fluid in a stopped turbomachine.

BRIEF DESCRIPTION OF THE DRAWINGS

Further characteristics and advantages of the invention will be better highlighted by the review of the following detailed description of a preferred, but not exclusive, embodiment illustrated for illustration purposes only and without limitations, with the aid of the accompanying drawings, in which.

DETAILED DESCRIPTION OF THE INVENTION

Figure 1:
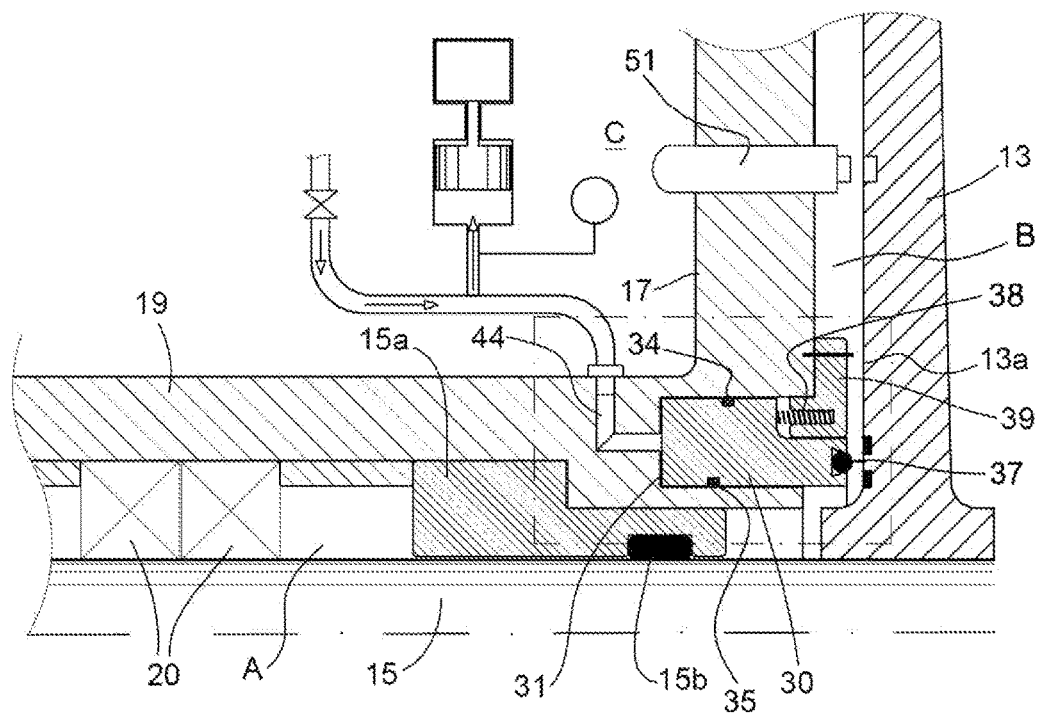
FIG. 1 is an axisymmetric and schematic section of part of a turbine expander indicative of the state of art, previously commented on in relation to EP 2591211.

FIG. 1 is a schematic view of a portion of a turbomachine, in particular of a turbine operating in an Organic Rankine Cycle ORC system according to the known art. The turbine comprises a shaft 15 bearing a disc 13. The shaft 15 can be supported in a supporting sleeve 19, also named chuck, by interposed bearings 20 and other interposed bearings installed to the left of the bearings 20 and not shown. In this case, the disc 13 will be cantilevered with respect to the shaft-bearings system, since it is mounted to the right of the bearings 20. Around the shaft 15, between it and the supporting sleeve 19, a housing 15a bearing at least one sealing system 15b and which allows the rotation of the shaft 15, is provided, anyhow obtaining an effective seal so that to prevent, or anyhow limit, the passage of fluid between an environment A, arranged to the left of the sealing system 15b, and an environment B towards which the side of the disc 13, also to the left, is facing. The sealing system can be constituted, by way of example, by one or more mechanical seals, one or more elastomeric ring seals, one or more staffing seals, or a combination of these elements, or other. The supporting sleeve 19 of the rotating shaft 15 can be integral with (as in the figure) or fastened to removable elements such as bolts, a static structure 17, i.e. not rotating. This static structure 17 has a part in front of the disc 13 and which separates the environment B from the environment C outside of the structure itself.

The environment A corresponds to an environment at a first pressure where the bearings 20 are present; the environment B corresponds to a part of the inner environment of the rotating machine, in which a working fluid is present at a second operating pressure; the environment C is at the environmental pressure outside of the static structure or casing 17 depending on the machine installation location. The sealing system 15b is then subjected to the pressure difference between the environment A and the environment B, and, therefore, the fluid present in the environment B, at a higher pressure, has the tendency to flow towards the environment A, at a lower pressure, a tendency that, as mentioned above, will be regularly obstructed by the sealing system 15b during machine operations. Vice-versa, if the environment B is at a lower pressure than the environment A, the mechanical seal 15b prevents air or lubricating fluid from entering the bearings and/or mechanical seal during the process.

A further sealing device comprises at least one movable ring 30 housed and guided axially in a corresponding annular recess 31 obtained in a wall of the static structure 17 (shield or casing) in front of the disc 13 supported by the rotating shaft 15. By and large, the annular recess 31 and the movable ring 30 are concentric to the shaft 15, and whereas the recess 31 acts as a cylinder, the movable ring 30 is movable on command, like a piston, in said recess, towards and away from a facing surface 13a of said disc 13. Sealing gaskets (34 and 35) are mounted on the movable ring with respect to the recess 31.

The movable ring 30 has a head portion facing the disc 13 and, on the front of said portion, the movable ring 30 is provided with an annular throat in which an annular front sealing gasket 37, constituted by way of example by an O-ring made of elastomer, is housed and held. The movable ring 30 can be displaced between a rearward inactive position—shown in FIG. 1—, in which the front sealing gasket 37 is away from the facing surface 13a of the disc 13, and a forward active position—rightward, not shown in the figures—, in which the front sealing gasket 37 leans on the facing surface 13a of said disc 13. Said forward position is operated when the rotor is stopped (for example during the maintenance operations or when replacing the rotating seal 15b) to isolate the environment B from the environment A or C.

The displacement of the movable ring 30 is caused by pressurized fluid provided through the duct 44. The return to the initial position is caused by springs 38.

The gaskets 34, 35 and 37 are subject to wear if exposed to high temperatures over a long period of time. Moreover, although working at temperatures compatible with the elastomer material with which the gaskets 34 and 35 are made, they are not much denoted for the dynamic behavior to which they must be subjected. These problems are solved by the solution claimed in the present invention, since these gaskets 34 and 35 can be eliminated; the preferred embodiment will now be described in detail.

FIGS. 2-7 show a portion of turbine according to the present invention, even if the present invention is applicable, in general, to more types of rotating machines.

Essentially, the turbine portion shown in FIGS. 2-7 includes some components and parts equivalent to those represented and described above in relation to FIG. 1, which, for simplicity, are denoted by the same reference numbers.

Moreover, in the description and figures relating to the present invention, only two environments will be defined for simplicity: a first environment E, comprising any environment between the bellows piston 30x and the outer environment, and a second environment D defined as the space inside the machine where the working fluid is present.

Therefore, for example the environments A and C of FIG. 1 are included in the environment E of FIGS. 2-7.

The rotating shaft 15 is supported by bearings 20 with respect to a stationary supporting sleeve 19, also named chuck. With numeral reference 15b, a mechanical seal and the respective housing, which are equivalent to the sealing system 15a-15b shown in FIG. 1, are schematized.

In the example shown, the head 15c of the rotating shaft 15 has a section having greater diameter than the rest of the shaft 15, as depicted in FIGS. 2-7, at the head 15c.

The expression "axial" is used herein to denote axes or directions parallel to the rotation axis of the shaft 15.

Figure 2:
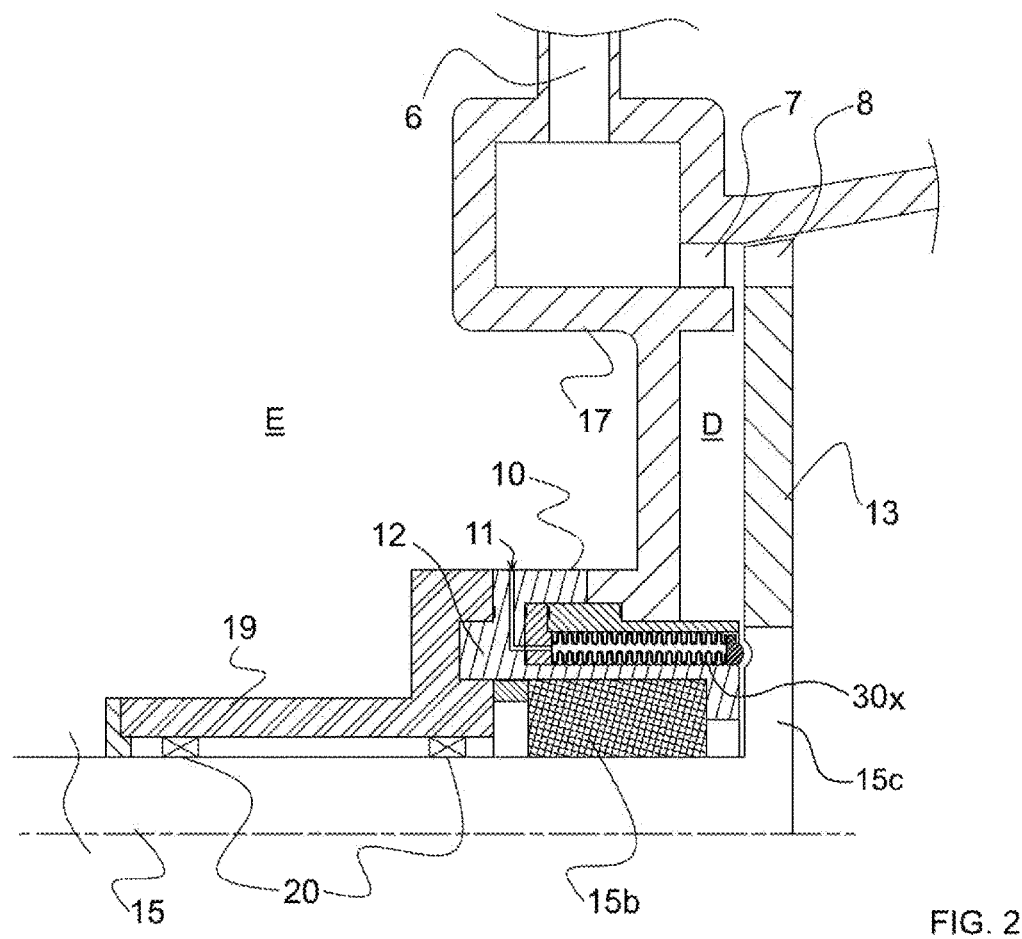
FIG. 2 is an axisymmetric and schematic section of part of a turbine expander according to the present invention, provided with a sealing device in a first configuration.
Figure 3:
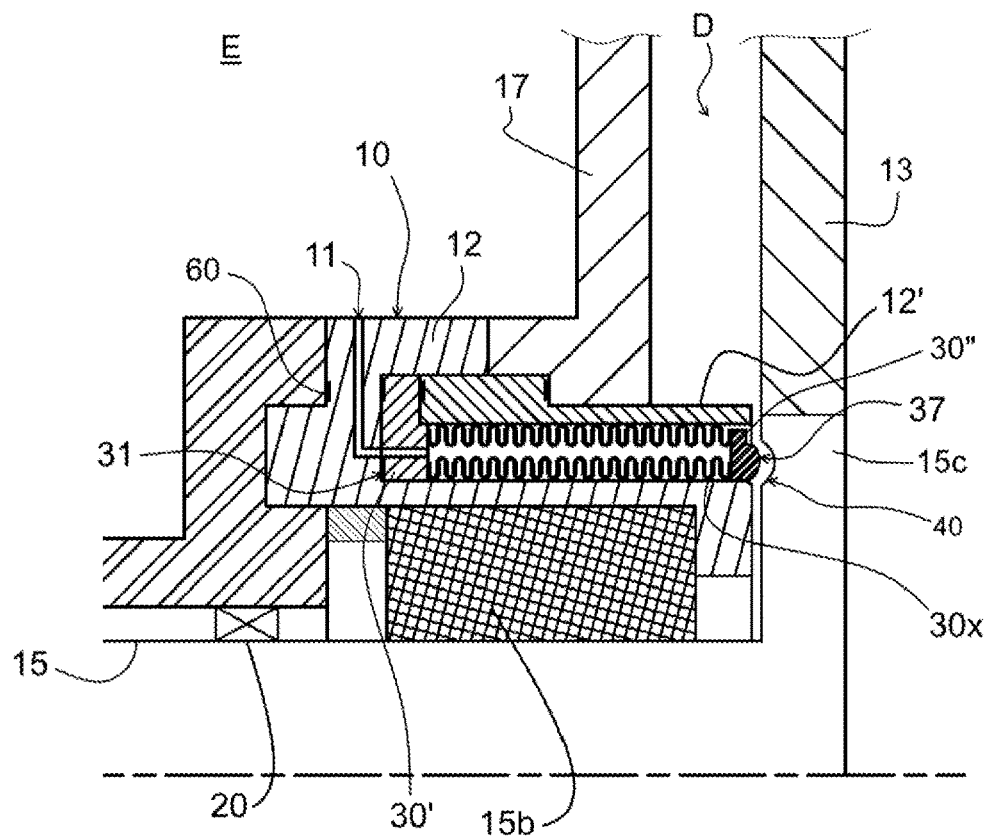
FIG. 3 is an enlargement of FIG. 2.

The supporting sleeve 19 is constrained to the static structure 17 of the turbine, for example the casing, by interposing a connecting ring 12, in turn equipped with the element 12' (FIGS. 2 and 3). An opening 6 is defined in the casing 17 for the entry of the working fluid in the turbine, directed towards the array of stator blades 7 for the beginning of the expansion. The array of rotor blades 8 fluidically coupled with the array of stator blades 7 is immediately arranged downstream thereof and is supported by a rotor disc 13, which is in turn coupled with the shaft 15, at its head 15c, so that to rotate with it integrally. FIG. 3 is an enlargement of FIG. 2 and shows the sealing device 10 in detail. In the connecting ring 12, which acts as a flange between the supporting sleeve 19 and the casing 17 of the turbine, the following are provided:

a supply duct 11 of a pressurized fluid for the activation of the sealing device 10 itself;

a seat 31, in particular defined by the connecting ring 12 and by the element associated 12' thereto, in which a bellows piston 30x reached by the duct 11 is movable axially.

Front seals (for example of graphite) 60 are provided between the connecting ring 12 and the ring 30' of the bellows piston 30x, schematized in the drawings as black rectangles, as between the ring 30' and the element 12'.

The seat 31 can possibly be implemented directly in the casing 17. However, the presence of the components 12 and 12', constrained to the casing but anyhow separable therefrom, allows an easy assembling (during the implementation of the machine) or disassembling (whenever the sealing system 10 should suffer malfunctions or if it were decided to revamp the entire machine) of the bellows sealing system 10, since it can be entirely extracted from the casing, on the side where the chuck is present.

Figure 4:
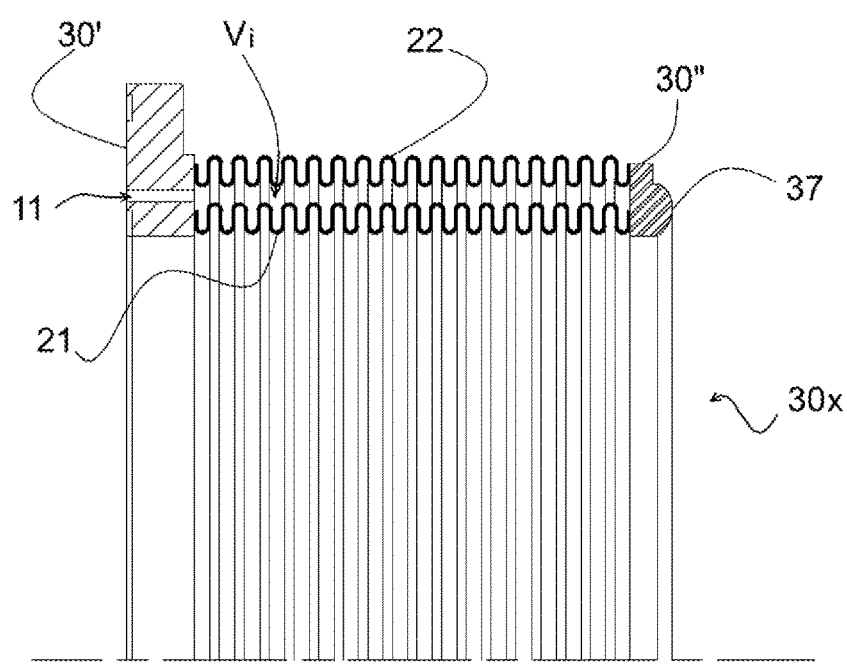
FIG. 4 is an axisymmetric and schematic section of a component of the sealing device of a turbomachine according to the present invention.

FIG. 4 shows the bellows piston 30x isolated from the other components of the turbine. The bellows piston 30x is an annular element formed by two concentric cylindrical bellows elements 21 and 22, for example made of steel, welded on a side (left in the figures) to a first ring 30' and on the other (right in the figures) to a second ring 30". On the right ring 30" there is a sealing surface 37 intended to engage a corresponding annular seat 40 obtained on the surface of the head 15c of the rotating shaft, facing the supporting sleeve 19. In a similar configuration, the annular seat 40 is directly obtained on the rotor disc 13 or any other part integral with the rotating shaft. The sealing surfaces 37 and 40 can be two complementary surfaces (concave-convex) or flat (one or both). The two cylindrical bellows elements 21 and 22 extend around the connecting ring 12, externally with respect to the rotating shaft 15. The diameter of the two cylindrical bellows elements 21 and 22 is different, so that an inner volume V, is defined between the inner cylindrical bellows element 21 and the outer cylindrical bellows element 22. A part of the supply duct 11 of a pressurized fluid extends through the ring 30'. When the bellows piston 30x is inserted in the respective seat 31 obtained in the connecting ring 12, the duct 11 allows the supply of a pressurized fluid in the inner volume V, to cause the expansion/dilatation of the bellows piston 30x.

As shown in FIGS. 3 and 4, the left ring 30' is constrained to the connecting ring 12, and therefore indirectly to the casing 17, and therefore remains stationary. The coupling is achieved with screws or bolts. Instead, the left ring 30" is not axially locked, but free to move in the seat 31 towards the rotor disc 13; therefore, the pressurization of the inner volume V, causes a dilatation of the two cylindrical bellows elements 21 and 22, which push the ring 30" towards the rotor disc 13 or the head 15c of the shaft, until making the sealing surface 37 abut against the annular seat 40.

The bellows piston 30x is radially constrained to the seat 31, between the connecting ring 12 and the element 12': in particular, the ring 30" is free to move along the cylindrical surfaces delimited by the ring 12 (radially arranged more inside the bellows piston) or by the element 12' (outside of the bellows); therefore, the accordion-like expansion of the two cylindrical bellows elements 21 and 22 can only occur in the axial direction, guided between two cylindrical surfaces.

Figure 5:
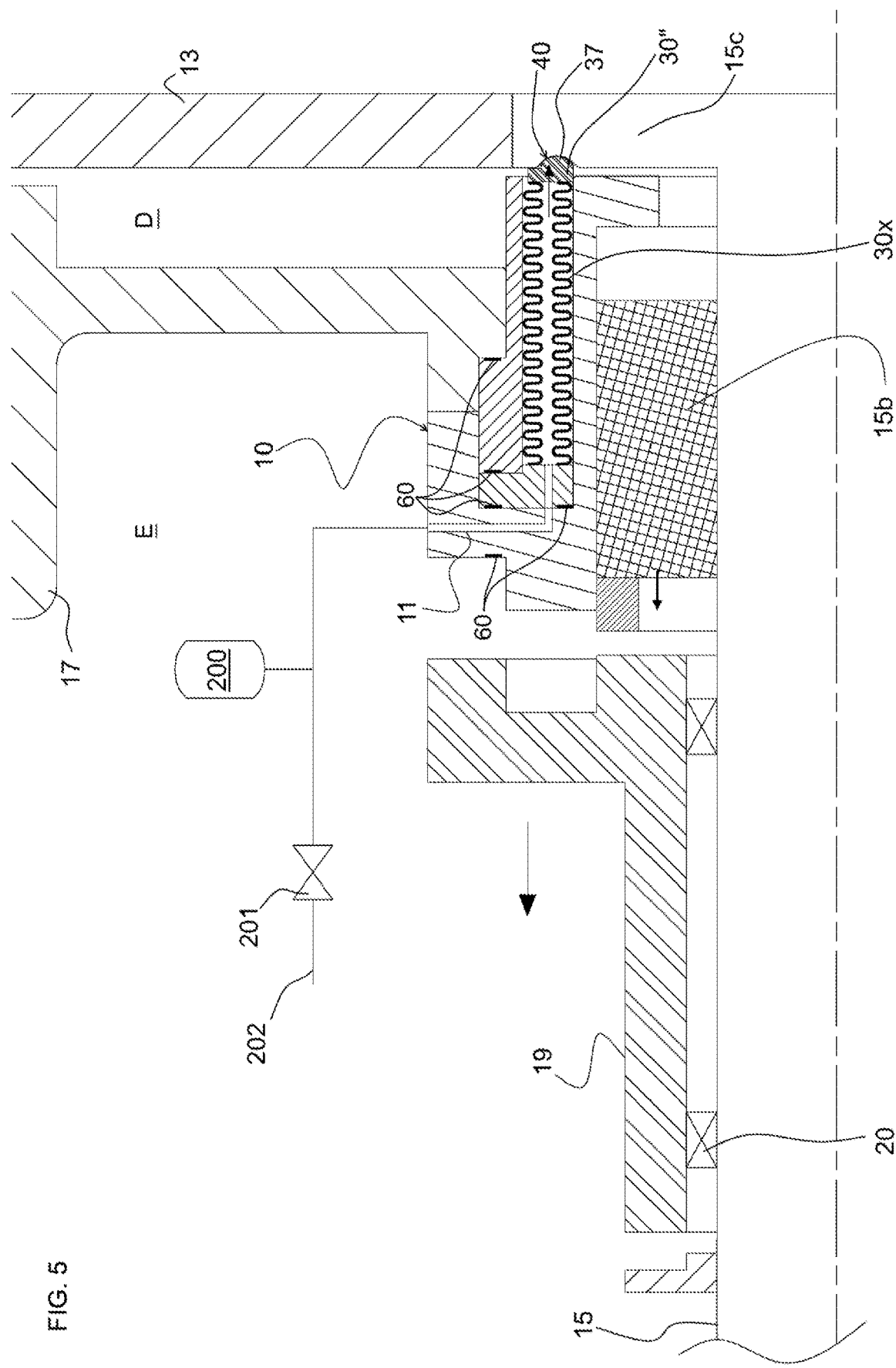
FIG. 5 is an axisymmetric and schematic section of the turbine expander shown in FIG. 2, in which the sealing device is in a second configuration.

In practice, the pressurization of the inner volume V, causes the movement of the ring 30" of the bellows piston 30x towards the forward active position shown in FIG. 5.

In fact, as shown in FIG. 5, by pressing on the head 15c of the shaft, the ring 30" achieves a sealing system that isolates the inner environment D of the turbine from the zone in which the bearings 20 and the mechanical seal 15b are mounted, therefore making it possible to dismantle them safely, avoiding the spillage or contamination of the working fluid. In fact, the turbine is partially shown dismantled in FIG. 5, with the supporting sleeve 19 spaced from the sealing device 10 and the casing 17.

Subsequently, it is also possible to remove the rotating seal 15b, still without any communication between the environments D and E.

The sealing surface 37 can be obtained by using an O-ring made of elastomeric material but, as described in relation to the known art, high temperatures would have negative impact on the O-ring gasket. Therefore, the sealing surface 37 is preferably a metal gasket or is obtained by opportunely working on a projection of the ring 30", so that to make a simple metal-metal contact with the seat 40. In this case, it is advisable to rectify the surface 37 and the seat 40 in order to achieve maximum performances in terms of fluidic sealing. Anyhow, it should be noted that a small leak between the surfaces 37 and 40 can be tolerated since only present during the few hours needed to carry out the maintenance, whereas it is much more important to eliminate the static gaskets 34 and 35 of FIG. 1 because a leak through these would act throughout the "normal" operations of the machine.

Advantageously, as can be seen in FIG. 5, the sealing device 10 allows to dismantle the turbine without using o-rings between the stationary parts and the movable parts (34 and 35 in FIG. 1). Before removing the bearings, when the turbine is stopped, the rotor and shaft are locked and supported with at least one screw passing in the casing, that can be operated from the outside and that is able to be gripped in a corresponding threaded hole on the rotor (see latch 51 in FIG. 1). After having actuated the sealing device 10, it is possible to replace the bearings 20 and the mechanical seal 15b arranged inside the turbine. The bearings 20 or the mechanical seal 15b can be slipped off the left end of the shaft 15, if they are smaller than the inner diameter of the supporting sleeve 19, since the configuration of the turbine is cantilevered. Otherwise, the supporting sleeve 19 can be unconstrained from the other fixed parts, thus making it possible to extract the bearings 20 and the mechanical seal 15b, while maintaining the inner environment D of the turbine isolated from the outer environment E.

The pressurization of the bellows piston 30x can be actuated with air, lubricating oil or with the working fluid of the ORC cycle.

At the end of the maintenance operations, the supply of pressurized fluid in the duct 11 is interrupted and the pressure of the volume V, inside the bellows piston 30x rapidly returns to the initial value, causing the contraction of the two cylindrical bellows elements 21 and 22 (springback) and the consequent backing away of the ring 30" in the seat 31, i.e. causing the return of the bellows piston 30x to the rearward inactive position, shown in FIG. 2.

It is advisable to size the loops of the two cylindrical bellows elements 21 and 22 to prevent, with low pressure differences between the inner volume V, and the outside, the bellows piston 30x from extending/dilating up to the forward active position. This precaution is useful in preventing the bellows piston 30x from coming into contact with the rotor part during the normal operations of the turbomachine; for example, in the systems operating at a pressure lower than the atmospheric pressure and in which the inner volume V, of the bellows is kept at the atmospheric pressure during the normal operations of the machine, the bellows piston 30x would always suffer from a pressure difference, which could move it towards the rotor disc 13. This operation is possible by selecting suitably stiff bellows elements, i.e. by selecting for example the number of loops for length unit, the shape and thickness of the loops.

A possible operative method of the sealing device 10 depending on the pressure difference between the inner volume V, of the bellows piston 30x and the inner environment D is illustrated in the following table 1.

TABLE 1 deformation of the bellows piston 30x

| pressure difference [bars] | elongation [mm] | load [kN] |
| --- | --- | --- |
| 0 | 0 | 0 |
| 2 | <1 | 0 |
| 4 | 5 | 0 |
| 10 | 5 | 12 |
| 16 | 5 | 25 |

For pressure differences of less than 2 bars, the axial deformation of the two cylindrical bellows elements 21 and 22 towards the head 15c of the shaft is negligible, i.e. lower than one millimeter. For pressure differences of 4 bars, the axial deformation of the two cylindrical bellows elements 21 and 22 is so that to displace the ring 30" of 5 mm towards the head 15c, a circumstance that bring the ring 30" into slight contact with the head of the shaft 15c, but without a sufficient thrust creating the seal. An increase in the pressure difference causes the contact force between the ring 30" and the head 15c to increase, and in particular between the sealing surface 37 and the seat 40, up to achieving the seal.

In an alternative configuration not shown in the figures, the bellows piston 30x is maintained in the rearward inactive position by springs; this decision, however, requires additional space for the positioning of the springs in the turbine and higher pressurization of the volume V, when wanting to operate the bellows piston 30x while the turbine is stopped.

The bellows piston 30x is cooled and acts as a radiator element that maintains the temperature of the sealing system lower than the temperature of the working fluid being in the environment D. The cooling can be achieved by supplying a coolant in the inner volume V, of the bellows piston 30x, making sure that the pressure of the coolant, in the volume V, does not reach or exceed the minimum pressure necessary for operating the bellows piston 30x, i.e. necessary to cause the expansion/dilatation of the two cylindrical bellows elements 21 and 22 and the movement of the sealing surface 37 towards the rotor part.

Coolants suitable for the purpose are, for example, oil and the same working fluid used in the thermodynamic cycle in which the turbomachine is inserted. The flow of coolant can circulate in a dedicated circuit or come from another cooling circuit of the lubricating system.

The possibility to use the bellows piston 30x also as radiant surface 16 allows to improve the operating conditions of the mechanical seal 15b, whose operating life—as mentioned in relation to the known art—tends to decrease with increasing operating temperatures.

Given that the two cylindrical bellows elements 21 and 22, by virtue of the configuration of the bellows, has a greater heat exchange surface, in relation to the axial extension of the bellows piston 30x, the cooling is particularly efficient.

FIG. 5 schematically shows a possible system for operating the bellows piston 30x in case the sealing system 10 is not also used for the cooling. In this case, a single pressurized fluid supply line 202 is sufficient, for example a line of compressed air or a nitrogen bottle, connected to the valve 201; following the pressurization, the valve 201 is closed. Moreover, it is advisable to also use an accumulation tank 200, to compensate any leaks in the circuit and to allow to safely carry out the maintenance operations.

Figure 6:
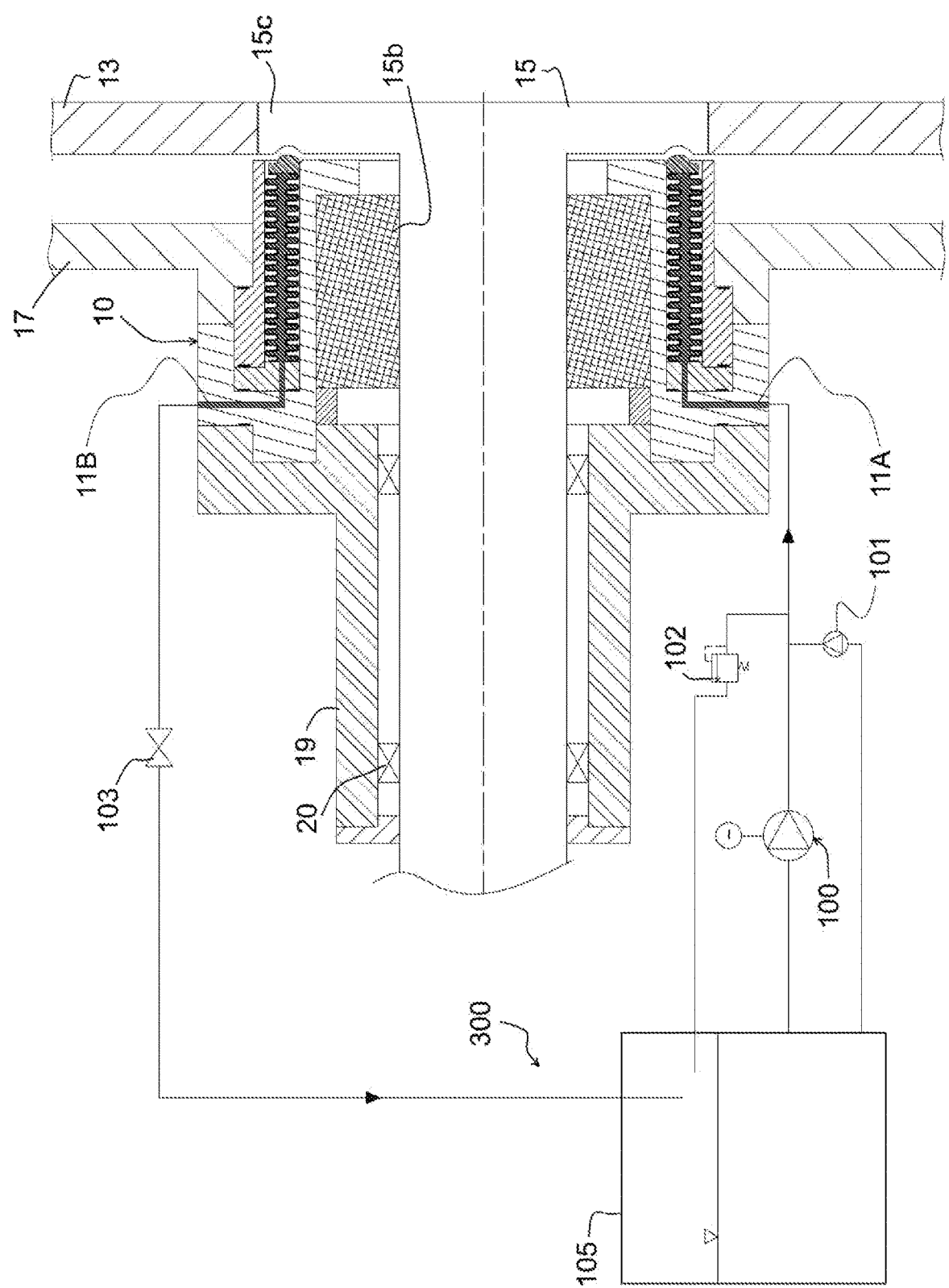
FIG. 6 is an axisymmetric and schematic section of the turbine expander shown in FIG. 2 and of a pressurization system associated thereto.

FIG. 6 schematically shows a possible system for operating the bellows piston 30x in case the sealing system 10 is subjected to cooling. The volume V, inside the two cylindrical bellows elements 21 and 22 is combined with two ducts: an inlet duct 11 A and an outlet duct 11 B, so that to achieve a cooling circuit 300. In the example shown in FIG. 6, the circuit 300 comprises a pump 100 that withdraws the coolant from a tank 105 and pushes it into the bellows piston 30x through the inlet channel 11 A. After having completed its cooling action on the bellows piston 30x, the coolant comes out through the channel 11 B and returns to the tank 105, which is cooled with appropriate means and circuits (not shown).

When the sealing device 10 must be operated when the machine is stopped, the electric-motor pump 100 is stopped, and the valve 103 arranged on the outlet channel 11 B is closed. A pump 101, for example of the positive-displacement and manual piston type, is therefore actuated to pressurize the circuit 300 and the bellows piston 30x. A relief valve 102 of the main pump 100 is used to avoid excessive pressurization of the bellows piston 30x. It is possible to pressurize the bellows piston only with the pump 100, by closing the valve 103 and by allowing the flow excess to drain from the relief valve 102.

It is preferable to actuate, i.e. pressurize, the piston with a manual closed-circuit system since independent from any damage or network interruptions, which can cause the inadvertent disconnection of the bellows sealing system.

Figure 7:
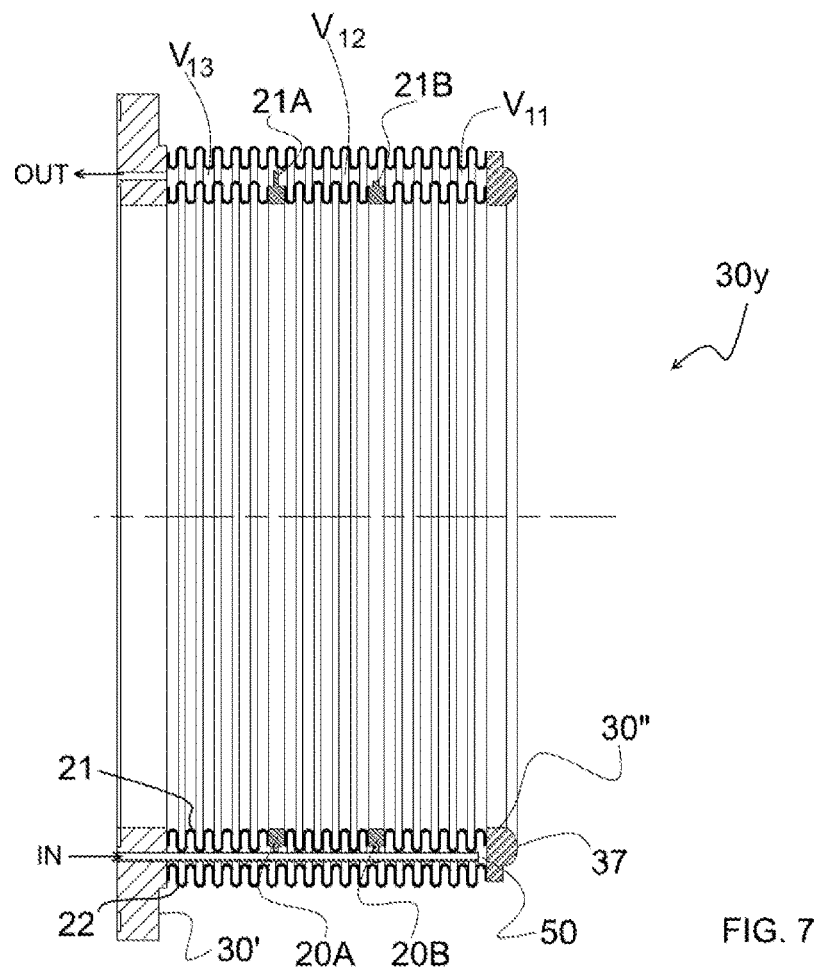
FIG. 7 is an axisymmetric and schematic section of an alternative version of the component of the sealing device shown in FIG. 4.
Figure 8:
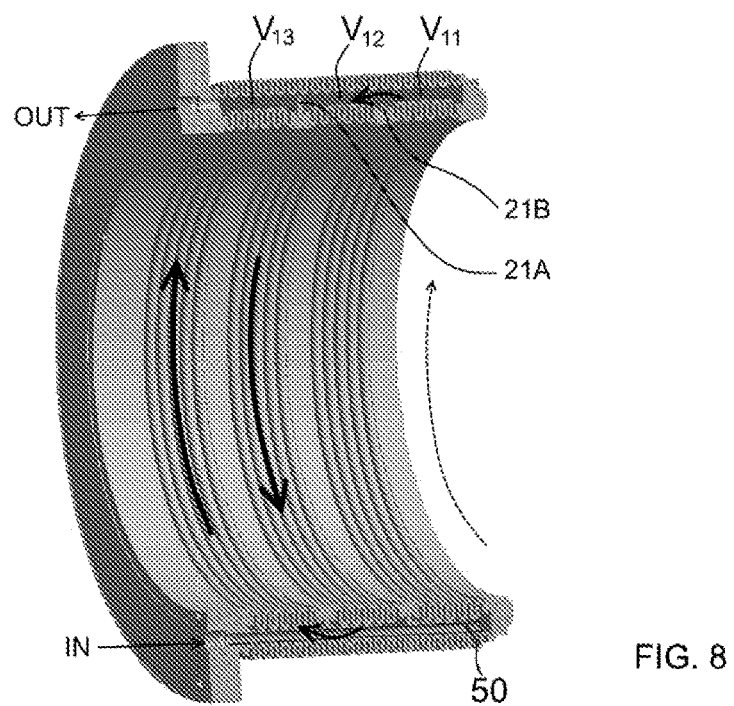
FIG. 8 is a perspective view of part of the component of the sealing device shown in FIG. 7.

FIGS. 7 and 8 are schematic views of the preferred embodiment of the bellows piston 30y. In order to improve effectiveness as thermal barrier, the inner volume V, of the bellows piston 30y was subdivided in three chambers Vn, V12 and V13 by two radial septa 21 A and 21 B: this precaution allows to avoid stagnation zones and create a preferential path for the coolant. Each septum 21 A and 21 B is respectively part of the rings 20A and 20B welded to the loops of the bellows element 21, and are arranged at about one third and two thirds of the axial extent of the bellows piston 30y.

The coolant delivery in the inner volume V, occurs through a cannula 50 up to the chamber Vn, the furthest from the inlet IN. The coolant is distributed tangentially, as denoted by the dashed arrow in FIG. 8. In the chamber Vn, the coolant, delimited to the left by the septum 21 B and to the right by the ring 30", flows tangentially along the loops between the two cylindrical bellows elements 21 and 22, up to overtaking the septum 21 B, at about 180° with respect to the inlet channel IN, i.e. where the septum 21 B is interrupted for a certain angular extent. The fluid therefore passes to the intermediate chamber V12 and continues its path tangentially, delimited to the left by the septum 21 A and to the right by the septum 21 B. At the inlet cannula 50, the septum 21 A is interrupted and therefore the fluid accesses the chamber V13, crosses again the space between the bellows and finally goes towards the outlet OUT.

The passage of the coolant between the chambers Vn-V13 defined by the radial septa 21 A 21 B occurs where the septa 21 A, 21 B do not radially intercept the entire interstice present between the two cylindrical bellows elements 21 and 22: in FIGS. 7 and 8, the septum 21 B is interrupted in the upper part, whereas the septum 21 A is interrupted in the lower part, where there is also the inlet cannula 50; for example, in both cases, the interruption of the septum extends for about 20° degrees.

If the average diameters of the two cylindrical bellows elements 21 and 22 are considerably different, or for other constructive requirements (for example, to compensate different stiffnesses), the bellows elements can have different loops in terms of numbers, size and shape. Each cylindrical bellows element 21, 22 can be made with a single wall or with multilayer techniques.

The invention claimed is:

1. A turbomachine comprising a stator part (17) and a rotor part rotating with respect to the stator part (17) in presence of a working fluid, wherein the rotor part comprises at least one rotor disc (13) borne by a rotating shaft (15), which is in turn supported by bearings (20) and provided with at least one rotating seal (15b) for confining the working fluid,
and comprising a fluid sealing device (10), provided with an annular element (30x) concentric to the rotating shaft (15) and provided with at least one annular sealing surface (37), and a seat (31) of the annular element (30x) in the stator part (17),
wherein said annular element (30x) can be operated to isolate a inner environment (D) of a rotating machine, where there is the working fluid, from an outer environment (E),
wherein said annular element is a bellows piston (30x) extensible or dilatable to move the at least one annular sealing surface (37) from a rearward inactive position, at which the at least one annular sealing surface (37) does not interact with the rotor part, to a forward active position, at which the at least one annular sealing surface (37) abuts against a component of the rotor part, the at least one rotor disc (13) or a head (15c) of the rotating shaft (15), thus assuring the isolation, and wherein a coolant is supplied inside the bellows piston (30x) during a normal operations of the machine;
wherein said seat (31) of the bellows piston is an annular seat, concentric to the rotating shaft (15), extending along the axial direction, i.e. parallel to the rotation axis of the rotating shaft (15), between the stator part of the machine to a point of facing the rotor disc (13) or the head (15c) of the shaft (15) and wherein the bellows piston (30x) slides axially in the seat (31) due to said extension/dilatation.

2. The turbomachine according to claim 1, wherein the bellows piston (30x) comprises two cylindrical elements (21, 22) which have different diameters and are concentrically arranged, joined to a first ring (30') at a first edge and to a second ring (30") at the opposite edge, and wherein an inner pressurizable volume (V,) is defined between the two cylindrical bellows elements (21, 22) and the two rings (30', 30").

3. The turbomachine according to claim 2, wherein a supply duct (11) of a pressurized fluid extends through the first ring (30') to allow the fluid sealing device (10) to be operated.

4. The turbomachine according to claim 2, wherein the first ring (30') is inserted in the seat (31) of the bellows piston (30x) and faces the stator part (17) of the machine and is integral thereto, and wherein the second ring (30"), which can move axially, bears the at least one annular sealing surface (37) and faces the at least one rotor disc (13) or the head (15c) of the rotating shaft (15).

5. The turbomachine according to claim 2, wherein the bellows piston (30x) can be operated by pressurizing the inner volume (V,) to a pressure higher than the pressure in the inner environment (D) of the machine and can be deactivated by re-establishing, in the inner volume (V,), a pressure lower than the minimum pressure necessary for moving the at least one annular sealing surface (37) in contact with the rotor part.

6. The turbomachine according to claim 2, wherein the two cylindrical bellows elements (21, 22), the first ring (30') and the second ring (30") are made of metal and joined by welding.

7. The turbomachine according to claim 2, wherein at least one of the two cylindrical bellows elements (21, 22) comprises one or more radial septa (21 A, 21 B) dividing the inner volume (V,) in two or more communicating chambers (Vn-V13) arranged in succession between the first ring (30') and the second ring (30"), so that to make a preferential path for the coolant.

8. The turbomachine according to claim 1, wherein the annular sealing surface (37) is made of metal and is intended to abut against a flat surface or seat (40) having shape complementary to the at least one annular sealing surface (37), which is obtained in the at least one rotor disc (13) or in the head (15c) of the rotating shaft (15), or is an annular gasket made of an elastomeric material.

9. The turbomachine according to claim 1, wherein the bellows piston (30x) has an inlet (IN) for the coolant obtained in thea first ring (30') and a cannula (50) extending from the inlet (IN) to thea chamber (Vn) near to thea second ring (30"), and comprising an outlet (OUT) for the coolant obtained in the first ring (30'), in a position diametrically opposed with respect to the inlet (IN), and wherein the coolant flows from the chamber (Vn) near to the second ring (30") to other chambers and, at the end, to the outlet (OUT), by overtaking the radial septa (21 A, 21 B) where they are interrupted.

10. The turbomachine according to claim 1, wherein said turbomachine is a turbine operating in an Organic Rankine Cycle.

\* \* \* \* \*